United States Patent [19]
Foust

[11] Patent Number: 5,267,437
[45] Date of Patent: Dec. 7, 1993

[54] DUAL MODE ROCKET ENGINE

[75] Inventor: Robert R. Foust, Palm Beach Gardens, Fla.

[73] Assignee: United Technologies Corporation, Hartford, Conn.

[21] Appl. No.: 704,549

[22] Filed: May 23, 1991

[51] Int. Cl.⁵ .............................................. F02K 9/00
[52] U.S. Cl. ........................................ 60/206; 60/259; 60/267
[58] Field of Search ................. 60/257, 259, 260, 266, 60/267, 269, 206, 240, 243, 204; 244/172, 135 R, 135 C

[56] References Cited

U.S. PATENT DOCUMENTS

| | | | |
|---|---|---|---|
| 3,613,375 | 10/1971 | Abild | 60/267 |
| 3,623,329 | 11/1971 | Abild | 60/259 |
| 4,771,600 | 9/1988 | Limerick et al. | 60/259 |
| 4,859,253 | 5/1988 | Wagner | 60/266 |
| 4,912,925 | 4/1990 | Foust | 244/135 C |
| 4,998,410 | 3/1991 | Martinez-Leon et al. | 60/260 |
| 5,116,000 | 5/1992 | Girard | 244/135 C |

FOREIGN PATENT DOCUMENTS

| | | | |
|---|---|---|---|
| 0252238 | 1/1988 | European Pat. Off. | 60/259 |
| 3228162 | 2/1984 | Fed. Rep. of Germany | 60/259 |

OTHER PUBLICATIONS

"Space Shuttle Engines Stress Low Cost, Maintenance, Reuse." Automotive Engineering, Oct., 1972, pp. 21–29.

Primary Examiner—Richard A. Bertsch
Assistant Examiner—Timothy S. Thorpe

[57] ABSTRACT

Disclosed is a rocket engine having a low operating mode in which propellants are provided to the combustion chamber by the combined effect of boost pumps and the pressure differential between the propellant tanks and the combustion chamber, and a high operating mode in which primary pumps further increase the pressure at which propellant is provided to the combustion chamber.

5 Claims, 1 Drawing Sheet

DUAL MODE ROCKET ENGINE

DESCRIPTION

1. Field of the Invention

This invention relates to rocket engines, and specifically to rocket engines used on missions requiring multiple firings of the rocket engine.

2. Background of the Invention

Space launch vehicles, particularly those that are defined as "upper state" (i.e. boosted to a high altitude by one or more booster rockets) benefit from the high efficiency provided by use of cryogenic propellants, such as liquid hydrogen and liquid oxygen. Because of the high performance requirements of these engines, the propellant pumps, typically turbopumps, must pump to high pressure at high efficiency and minimum weight. For certain applications, engines operate most efficiently when two pumps are used in series, thereby minimizing the individual requirements of each turbopump. In such engines a low pressure "boost" pump, optimized for low inlet pressure and net positive suction pressure, pumps the propellant to a relatively low discharge pressure, that being the discharge pressure necessary to permit the primary pump to operate more efficiently to provide the propellant to the combustion chamber/nozzle assembly at a substantially higher pressure.

The pumps used to pump cryogenic propellants such as hydrogen and oxygen must be cooled down to near propellant temperatures prior to pump operation. In the prior art, some boost pumps were driven by a monopropellant stored in a separate tank. The monopropellant decomposes in the presence of a catalyst producing heated gas to drive the boost pumps during cooldown and normal engine operation. However, driving the boost pumps with monopropellant adds the weight of a tank and the monopropellant therein to the overall rocket engine weight.

To minimize weight, some rocket engines bleed propellant through the primary pumps for cooldown thereof, dumping the propellant overboard. For upper stage engines, which typically make multiple starts, or firings, multiple cooldowns must take place, and dumping the propellants overboard during cooldown represents a significant loss of potential propellant which might otherwise provide substantial thrust.

What is needed is a rocket engine which produces usable thrust from the propellants used for cooldown.

DISCLOSURE OF THE INVENTION

It is therefore an object of the present invention to provide a rocket engine which produces usable thrust from the propellants used to cool down propellant pumps between successive engine firings.

According to the present invention a dual mode rocket engine is disclosed having a boost pump located in each of the propellant tanks and a fuel bypass line which allows firing of the rocket engine in a "low", or cooldown, mode that does not require operation of the primary propellant pumps, and a "high", or normal mode that provides full thrust operation of the rocket engine.

The foregoing and other features and advantages of the present invention will become more apparent from the following description and accompanying drawings.

BEST MODE FOR CARRYING OUT THE INVENTION

Figure 1:
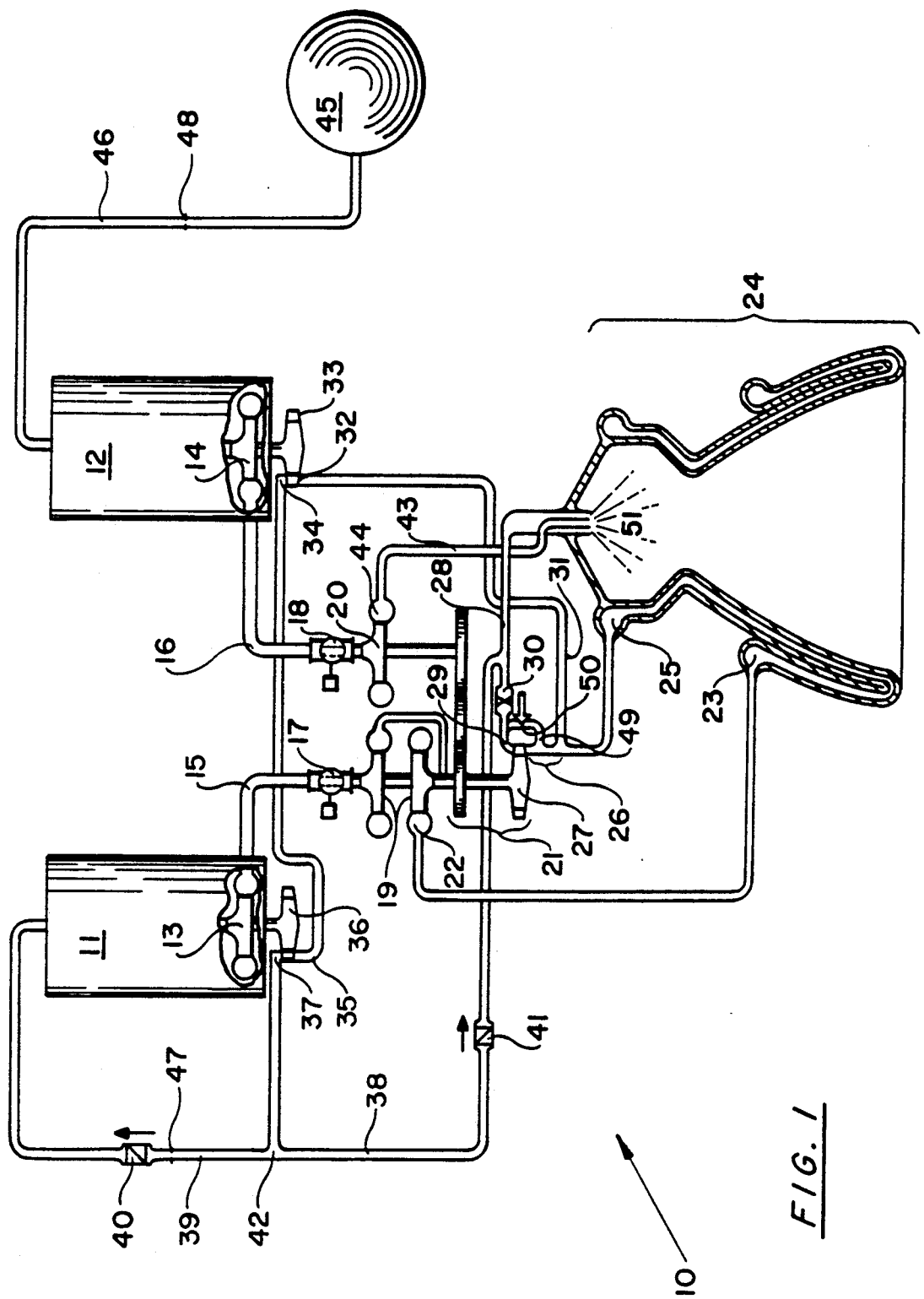
FIG. 1 is a schematic drawing of the dual mode rocket engine of the present invention.

FIG. 1 shows a schematic of an expander cycle rocket engine 10 of the present invention. The rocket engine has two cryogenic propellant tanks, one 11 containing fuel and the other 12 containing oxidizer. Each tank 11, 12 has a boost pump 13, 14 for pumping propellant from the tanks into supply lines 15, 16 to supply fuel and oxidizer to the primary fuel pump and the primary oxidizer pump, respectively. Each of the supply lines 15, 16 includes a shutoff valve 17, 18 to initiate or terminate the flow of propellant therethrough. The primary pumps 19, 20 are driven by a single drive means 21 such as a turbine and gear assembly which fixes the ratio between the two primary pumps 19, 20 to provide the desired to fuel-to-oxidizer ratio of propellants. (Series turbines for the two pumps and individual flow controls are an alternative, equally appropriate for this invention.) The discharge of the primary fuel pump 22 is connected to the inlet 23 of the regeneratively cooled thrust chamber/nozzle assembly 24. The discharge 25 of the regeneratively cooled thrust chamber/nozzle assembly 24 is connected to a primary turbine inlet 26 adjacent the primary turbine 27 to provide fuel propellant as the working fluid to drive the primary turbine 27.

A primary turbine discharge line 28 connected to the outlet 29 of the primary turbine 27 provides fuel propellant to the combustion chamber 51. The primary turbine discharge line 28 includes a turbine flow shutoff valve 30 for initiating or terminating the flow of fuel propellant through the primary turbine 27. A boost pump turbine supply line 31 connected between the primary turbine inlet 26 and the turbine inlet 32 of one of the boost pumps, preferably the oxidizer boost pump turbine 33, provides fuel propellant thereto as working fluid.

The discharge 34 of the oxidizer boost pump turbine 33 is connected to the turbine inlet 35 of the fuel boost pump turbine 36 to provide fuel propellant thereto. The discharge 37 of the fuel boost pump turbine 36 is connected by the fuel boost pump turbine discharge line 38 to the primary turbine discharge line 28 downstream of the turbine flow control valve 30. A fuel tank pressurization line 39 which branches off the boost pump turbine discharge line 38 maintains pressure of the propellant within the fuel tank. A first check valve 40 in the fuel pressurization line 39 prevents flow out of the fuel tank 11 through the fuel pressurization line 39. A second check valve 41 in the boost pump turbine discharge line 38 downstream of the fuel pressurization line junction 42 prevents back-flow of fuel from the primary turbine discharge line 28 through the boost pump turbine discharge line 38.

A primary oxidizer pump discharge line 43 connects the primary oxidizer pump discharge to the combustion chamber 51 to provide oxidizer thereto. Pressure in the oxidizer tank 12 is maintained by a pressure source, such as a tank 45 containing helium, connected to the oxidizer tank 12 by an oxidizer pressurization line 46. Orifices 47, 48 in the pressurization lines 39, 46 limit the rate at which the propellant tanks 11, 12 can be pressurized. In the preferred embodiment, a primary turbine bypass line 49 connects the primary turbine inlet 26 to the primary turbine discharge line 28 upstream of the turbine flow control valve 30. The bypass line 49 includes a controller 50 to control thrust during high mode operation.

In operation, low mode is initiated by operating the propellant valves 17, 18. The oxidizer flows from the oxidizer boost pump 14 through the primary oxidizer pump 20 to the combustion chamber/nozzle assembly 24, driven by the pressure differential between the oxidizer tank 12 and the combustion chamber 51. The fuel flows from the fuel boost pump 13 through the primary fuel pump 19 to the regeneratively cooled thrust chamber/nozzle assembly 24. In low mode operation, the turbine flow control valve 30 is closed, forcing the fuel to bypass the primary turbine 27. Thus, the primary pumps 19, 20 do not operate during low mode operation. The fuel from the regeneratively cooled combustion chamber/nozzle assembly 24 flows through the boost pump turbines 33, 36, driving the boost pumps 13, 14. The fuel then flows to the combustion chamber 51 where the propellants are ignited. Fuel flow to the combustion chamber 51 is likewise provided by the pressure differential between flask tank 11 and the combustion chamber 51. Heat from the combustion process is absorbed by fuel flowing through the regeneratively cooled combustion chamber/nozzle assembly 24, increasing the vaporization rate of the fuel therein and providing additional energy to drive the boost pump turbines 33, 36. As the fuel boost pump 13 produces pressure, a portion of the fuel leaving the fuel boost pump turbine 36 is diverted through the fuel tank check valve 40 to maintain fuel tank pressure.

Once the primary pumps 19, 20 have been sufficiently cooled down by the flow of propellant therethrough, the turbine flow control valve 30 may be opened to switch to high mode operation. This allows vaporized fuel to flow through the primary turbine 27 in addition to the boost pump turbines 33, 36, thereby driving the primary pumps 19, 20 and producing high mode thrust. Increasing pressure in the system causes check valve 41 to close, as those skilled in the art will readily appreciate, diverting all of the fuel flow from the fuel boost pump turbine 36 to the fuel tank 11 to maintain tank pressure. Operation is terminated by closing the flow control valves 17, 18 and the turbine flow control valve 30. Alternatively, the turbine flow control valve 30 may be closed and valves 17 and 18 left open to switch back to low mode operation.

Although this invention has been shown and described with respect to detailed embodiments thereof, it will be understood by those skilled in the art that various changes in form and detail thereof may be made without departing from the spirit and scope of the claimed invention.

I claim:

1. A rocket engine comprising:
   a combustion chamber/nozzle assembly having
   a combustion chamber, and
   a nozzle, said nozzle integral with said combustion chamber;
   a plurality of tanks containing cryogenic propellants at a pressure greater than ambient pressure;
   a plurality of first supply lines equal to the number of tanks to pump propellant from the tanks, one of said first supply lines connected to each of said tanks, and each first supply line having a propellant shutoff valve therein;
   a plurality of primary pumps equal to the number of tanks, each primary pump having a primary pump inlet and a primary pump outlet, each of the primary pump inlets connected to one of said first supply lines;
   primary turbine means for driving the primary pumps with one of the propellants, said primary turbine means having a primary turbine inlet and a primary turbine outlet;
   a primary turbine discharge line connecting the primary turbine outlet to the combustion chamber;
   a boost pump turbine supply line connected to the primary turbine inlet;
   a first connecting line;
   a second connecting line connecting the primary pump outlet of one of the primary pumps to the primary turbine inlet;
   a boost pump turbine discharge line connected to the primary turbine discharge line;
   a plurality of boost pumps equal to the number of tanks, one of said boost pumps located in each of said tanks, each boost pump including a boost pump turbine having a boost pump turbine inlet and a boost pump turbine outlet, one of said boost pumps having said boost pump turbine supply line connected to the boost pump turbine inlet thereof and the first connecting line connected to the boost pump turbine outlet thereof, and the other boost pump having the first connecting line connected to the boost pump turbine inlet thereof and the boost pump turbine discharge line connected to the boost pump turbine outlet thereof; and,
   a turbine flow control valve in said primary turbine discharge line between the primary turbine outlet and said boost pump turbine discharge line for selectively directing propellant through the primary turbine discharge line and the boost pump turbine supply line.

2. The rocket engine of claim 1 wherein the boost pump turbine discharge line includes
   means for preventing propellant from flowing from the primary turbine discharge line to any of said boost pump turbine outlets directly through the boost pump turbine discharge line.

3. The rocket engine of claim 2 further comprising
   a bypass line connecting the primary turbine inlet directly to said primary turbine discharge line, said bypass line connected to said primary turbine discharge line between said primary turbine outlet and said turbine flow control valve, said bypass line including means for selectively controlling the flow of propellant therethrough.

4. The rocket engine of claim 3 further comprising
   a pressurization line connecting one of the tanks to the boost pump turbine discharge line, said pressurization line including a check valve for preventing propellant from flowing from one of said tanks to the boost pump turbine discharge line directly through the pressurization line.

5. In a rocket engine having a combustion chamber, a nozzle integral with said combustion chamber, a first tank containing a first cryogenic propellant and a first boost pump, a second tank containing a second cryogenic propellant and a second boost pump, each propellant at a tank pressure in excess of ambient pressure, and a plurality of primary pumps, each primary pump having an inlet for receiving one of the propellants and an outlet for discharging one of the propellants, a method of efficiently cooling the primary pumps to desired temperatures near the temperatures of the propellants in the first and second tanks upon starting the rocket engine, said method comprising:

exposing the inlets of the primary pumps to said tank pressures and said outlets of the primary pumps to ambient pressure to create a pressure differential across the inlet and outlet of each of the primary pumps, thereby initiating flow of the propellants through the primary pumps to achieve cooling thereof;

discharging the propellants from the primary pumps;

vaporizing the first propellant after discharge from one of said primary pumps;

using the vaporized first propellant to drive the boost pumps to increase the pressure differential across the primary pumps;

mixing the second propellant flowing from one of the primary pumps with the first propellant flowing from the boost pumps and combusting the mixed propellants in the combustion chamber to produce heat and thrust;

flowing the first propellant discharging from one of the primary pumps into close proximity with the combustion chamber and nozzle to heat the first propellant discharged from one of the primary pump outlets and increase the vaporization rate thereof to provide additional energy to the vaporized first propellant to drive the boost pumps;

maintaining the flow of propellants through the primary pumps until the primary pumps have been cooled to the desired temperature by the propellants; and using the heated first propellant to drive the primary pumps.

* * * * *

UNITED STATES PATENT AND TRADEMARK OFFICE
CERTIFICATE OF CORRECTION

PATENT NO.  : 5,267,437
DATED       : December 7, 1993
INVENTOR(S) : Robert R. Foust It is certified that error appears in the above-identified patent and that said Letters Patent is hereby corrected as shown below:

In column 1, line 12, "'upper state"' should read --"upper stage"--
In column 3, line 24, "flask tank 11" should read --fuel tank 11--

Signed and Sealed this

Twenty-sixth Day of July, 1994

Attest:

BRUCE LEHMAN

Attesting Officer      Commissioner of Patents and Trademarks